United States Patent [19]

Gänswein et al.

[11] 4,178,082

[45] Dec. 11, 1979

[54] HARDENED CIRCULAR SPECTACLE-LENS ELEMENT AND METHOD OF MAKING THE SAME

[75] Inventors: Bernhard Gänswein; Erwin J. Daniels, both of Aalen; Herman Schürle, Oberkochen, all of Fed. Rep. of Germany; Klaus Grosskopf, Petersburg, Va.

[73] Assignee: Carl Zeiss-Stiftung, Oberkochen, Fed. Rep. of Germany

[21] Appl. No.: 856,538

[22] Filed: Dec. 1, 1977

[30] Foreign Application Priority Data

Dec. 18, 1976 [DE] Fed. Rep. of Germany ....... 2657459

[51] Int. Cl.² ................... G02C 7/02; C03C 15/00; B24B 1/00
[52] U.S. Cl. .................................... 351/159; 351/166; 351/177; 65/30 E; 65/115; 51/284 E
[58] Field of Search .............. 65/115, 114, 30 E, 303; 351/159, 177, 174, 166; 51/284 E

[56] References Cited

U.S. PATENT DOCUMENTS

| 2,762,166 | 9/1956 | Vent | 65/114 |
| 3,251,726 | 5/1966 | Acloque | 65/115 |

*Primary Examiner*—Conrad J. Clark
*Attorney, Agent, or Firm*—Hopgood, Calimafde, Kalil, Blaustein & Lieberman

[57] ABSTRACT

The invention contemplates a circular spectacle-lens blank which is optically finished on both its front and back surfaces and which is characterized by locally hardened registering central areas of both surfaces. The hardened areas are sized to be universally included within the spectacle-frame profile of all frames within a given variety of frames, and the outer annular areas are unhardened and of such effective radial extent as to embrace all of such profiles within said variety, so that each finished and hardened blank is adapted for later edging to the profile of a later selected one of the frames within the given variety. Various methods are described for creating the indicated locally hardened regions on the otherwise-finished lens blanks.

11 Claims, 7 Drawing Figures

HARDENED CIRCULAR SPECTACLE-LENS ELEMENT AND METHOD OF MAKING THE SAME

The present invention relates to production of hardened circular spectacle-lens elements which are adapted for later edging to the peripheral contour of a particular spectacle frame.

Spectacle-lens elements are made predominantly of glass and therefore have the disadvantage that they are fragile. It is known that the impact strength of glass lenses can be substantially improved by so-called "hardening". In this connection, compressive stressses are produced in the layers of the glass which are near the surface, while layers lying below same are under tensile stress.

The hardening of the glass can be effected chemically. In such case, the lens to be hardened is dipped into a bath of molten salt, for instance $KNO_3$, and kept therein for several hours. The smaller sodium ions in the layers of glass close to the surface are replaced by larger potassium ions so that a compressive stress is established.

It is also possible to harden the glass thermally. In this case, the lens is heated as a whole and the surfaces then cooled rapidly by blowing cold air against them. Compressive stresses are, in this case also, developed in layers which are close to the surface.

It has been found that it is not possible to harden round lens blanks and thereafter edge the hardened lenses, i.e., adapt them to the shape of the eyeglass (spectacle) frame, by removal of material from the edge. Upon such removal of material, the stress conditions which have been built up upon the hardening are drastically changed, leading, in by far the majority of cases, to the breaking of the lens during the edging.

For this reason it has been necessary, up to now, to effect the hardening of eyeglasses after the edging has been effected by the optician. This means either a high expense for investments for the optician since he must have in his shop apparatus for the hardening of eyeglasses which is generally utilized insufficiently, or a large amount of time is required if the optician gives the eyeglasses to the eyeglass factory for hardening after the edging.

A further disadvantage results when eyeglasses are to be provided with a coating, for instance with an anti-reflection coating. Most coatings can only be applied after the hardening, so that in general the edged eyeglasses go back from the optician to the eyeglass manufacturer, for hardening and subsequent coating.

It is known that these disadvantages can be avoided by only relatively slightly hardening the completely worked eyeglasses prior to the edging and then chamfering in such a manner, upon careful edging, that the angle between the chamfer and the tangent to the optical surface is not greater than 45°. Only if the chamfer is thereupon further polished, preferably fire-polished, are satisfactory products obtained.

The method is very cumbersome and expensive and does not lead to the desired results in all cases. In particular, the strength of the eyeglass is reduced by the edging and chamfering.

The object of the present invention is to provide hardened, non-edged (i.e., circular) eyeglasses (lens elements) which enable the optician to effect edging by customary methods without the glass breaking and without reducing the strength achieved as a result of the hardening.

This purpose is achieved, in accordance with the invention, in the manner that during the hardening the action of the hardening medium is limited to a central region of the uncut circular glass, the diameter of said region being smaller than the diameter of the ultimately desired edge contour of the eyeglass. The eyeglass is therefore hardened only in a central region which is surrounded by a non-hardened annular zone.

Upon the subsequent edging, only material in the non-hardened annular zone is removed, i.e., the actually hardened central region remains unaffected. In this way, a bursting of the eyeglass and a decrease in strength are avoided.

It has been found that in the case of eyeglasses which have been hardened by the new method there is a certain transition zone between the hardened region and the non-hardened region. This is probably the reason for the surprising fact that upon the subsequent edging it is possible to grind even the edge of the hardened central region without the eyeglass bursting or losing its strength.

The eyeglasses produced by the new method can be completely worked, hardened, and provided with a desired coating by the eyeglass factory and then delivered to the optician. The latter can edge the circular uncut eyeglasses in the customary manner, without any special precautionary measures.

All glasses customarily used for the manufacture of eyeglasses, as well as special glasses which can be readily hardened chemically, can be processed excellently by the new method. In particular, it is also possible to harden phototropic glasses.

The hardening in accordance with the new method can be effected thermally, the eyeglass which is to be hardened being heated only in the central region and the glass then being cooled as a whole. It is also possible to heat the eyeglass to be hardened as a whole and thereupon cool it only within the central region.

It is particularly advantageous to effect the hardening chemically in the process of the invention. For this purpose, an annular layer of a masking substance which impedes ion exchange is formed on both sides of the eyeglass to be hardened so as to surround the central region; the glass is thereupon introduced as a whole into a bath of hardening salts and maintained therein for a predetermined period of time and then, after the removal of the glass from the bath, the hardening salt and the masking substance are washed off.

The masking substance must satisfy various conditions. It must, in particular, cover the glass in such a manner that ion exchange is prevented in the covered region. Furthermore, the substance must not impair the optical surface quality of the eyeglass and in particular it must not chemically attack the glass. Finally, the substance must withstand the heating bath in the molten hardening salt without losing its aforementioned properties and without detrimentally affecting the salt bath. The substance must furthermore be capable of being removed free of residue and without great expense after the completion of the hardening process.

All of these prerequisites are excellently fulfilled by a suspension of kaolin in water.

The article and method of the present invention will be described in further detail below with reference to the accompanying drawings, in which.

Figure 1:
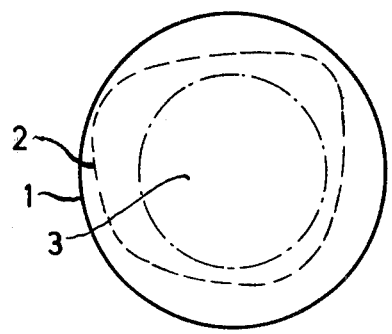
FIG. 1 is a plan view of an uncut eyeglass lens element, hardened in accordance with the new method.

In FIG. 1, 1 is a completely finished (but unedged) circular eyeglass blank. This glass is of such a diameter that it can be fitted, by grinding, into the eyeglass frame which is indicated by the dashed line 2. The glass itself is hardened only within the central region indicated by 3. This central region is therefore surrounded by an unhardened annular region.

Upon the edging of the eyeglass 1, some of the region between the dashed line 2 and the solid line is removed by the optician. As can be seen, the hardened region 3 is not affected thereby. However, even if some of the hardened central region 3 of the glass 1 should be cut into upon the edging of the glass due to the size and shape of the frame 2, the glass would neither burst nor lose its strength.

Figure 2:
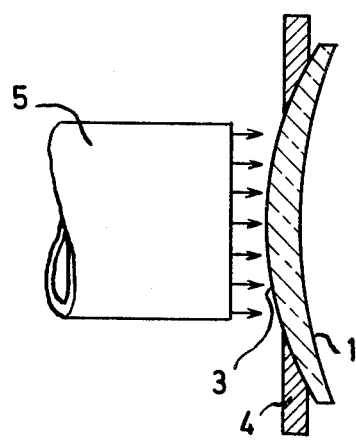
FIG. 2 is a diagrammatic view in side elevation of a device for thermal hardening, in application to the lens element of FIG. 1, the latter being shown in vertical section.

In the case of the apparatus for thermal hardening shown in FIG. 2, the eyeglass 1 is placed on a mask 4 which consists, for instance, of an insulating material and which exposes the circular region 3. The eyeglass 1 is heated by means of the radiator 5 over its central region 3 and thereupon rapidly cooled.

The showing of FIG. 2 is purely diagrammatic. Actually, both surfaces of the eyeglass 1 are preferably hardened at the same time the hardening being localized to opposed central regions.

Figure 3A:
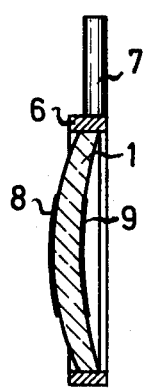
FIGS. 3a to e are similar diagrams to show various stages of a chemical hardening process carried out in accordance with the new method.
Figures 3B, 3C:
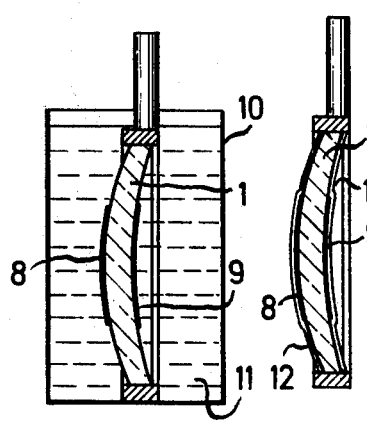

FIG. 3 shows various stages of a chemical hardening process taking place in accordance with the new method. In accordance with FIG. 3a, the eyeglass 1 to be hardened is first of all held in a ring 6 which is provided with a handle 7. Thereupon preferably circular foils 8 and 9 are applied to the central regions 3 and 3' respectively which are to be hardened on the two surfaces of the lens 1. The lens which has been prepared in this manner is then immersed, as shown in FIG. 3b, into a vessel 10 which contains a suspension of kaolin in water, designated 11.

After the eyeglass 1 has been removed from the container 10, it has (FIG. 3c) cover layers 12 and 13 of kaolin on its two surfaces, said cover layers, also covering the masks 8 and 9. As the next step, the lens is preheated in air to the temperature of the following salt bath, the kaolin slurry drying and the covering layers 12 and 13 becoming solid.

As the next step, the eyeglass 1 is dipped into a container 14 which contains a melt 15 of ordinary hardening salts. This melt has a temperature of about 420° C. to 440° C., and the eyeglass 1 is kept in the salt bath for, for instance, 16 hours. In this way, sodium ions in the layers close to the surface are replaced in the customary manner by potassium ions from the salt bath. This replacement is now, however, limited to the central regions 3 and 3' which have been laid bare in the meantime, while it is prevented in the regions covered by the annular cover layers 12 and 13.

The removal of the masks 8 and 9 is generally effected before the eyeglass 1 is introduced into the salt bath 15.

After the completion of the hardening process, the eyeglass 1 is removed from the container 14 and, after cooling to room temperature, the adherent residues of the hardening salt 15 and the kaolin layers 12 and 13 are washed off with hot water. This is effected in customary manner, for instance in an ultrasonic washing process.

Figures 3D, 3E:
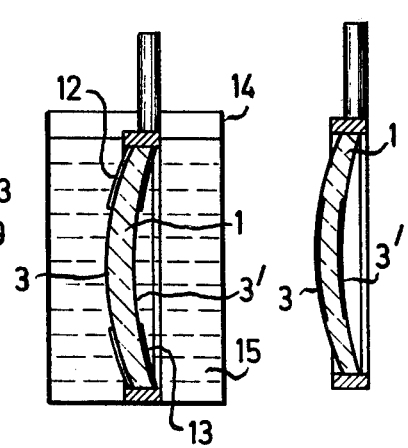

The resultant eyeglass 1 is shown in FIG. 3e. It can be seen that in those layers of the central regions 3 and 3' which are close to the surface a sufficiently deep exchange zone has been developed, which zone should reach a depth of about 100 $\mu$m. Within these central regions a compressive stress is formed, i.e., the glass 1 is hardened within these regions.

The eyeglass shown in FIG. 3e can thereupon be coated in customary manner and then, after delivery to the optician, be edged by the latter in customary manner without any special precautions being required.

The size of the hardened central region 3 is determined essentially by the shape of the eyeglass frame. There will generally be selected a circular central region 3 whose diameter is equal to about half of the diameter of the uncut eyeglass blank 1, but is at least 30 mm. As already stated, all ordinary glasses can be used and the thicknesses of the eyeglass 1 correspond to the normal and ordinary requirements for hardened glasses.

What is claimed is:

1. A hardened lens blank adapted for later edging to the profile needed for mounting in a selected one of a variety of spectacle frames, said blank being circular and having optically finished front and back surfaces, both of said surfaces being locally hardened in opposed central regions to the exclusion of opposed surrounding annular regions, said outer regions being of such effective radial extent as to include the requisite profile for each of the different spectacle frames within said variety.

2. A hardened lens blank adapted for later edging to the profile needed for mounting in a selected one of a variety of spectacle frames, said blank being circular and having optically finished front and back surfaces, both of said surfaces being locally hardened in registering central regions to the exclusion of registering outer annular regions, said hardened central regions being of such effective diametral extent as to be fully included within the requisite profiles of all the different spectacle frames within said variety.

3. The lens blank of claim 2, wherein such hardened central regions are tangent to the spectacle-frame profile of at least one of the frames within said variety.

4. The lens blank of claim 2, in which the effective diameter of such central regions is substantially one half the diameter of the lens-blank periphery.

5. The lens blank of claim 2, in which the effective diameter of said central regions is at least 30 millimeters.

6. The method of making a lens blank adapted for later edging to the profile needed for mounting in a selected one of a variety of spectacle frames, which method comprises selecting and optically finishing both front and back surfaces of a circular blank that is large enough to embrace the profiles of all frames within said plurality, and then locally hardening said surfaces in opposed central areas to the exclusion of opposed annular outer regions, said hardened central areas being of such effective diametral extent as to be fully included within the requisite profiles of all said frames, whereby the outer regions are of unhardened material and are of such effective radial extent as to enable later edging to the profile of a selected one of said frames.

7. The method of claim 6, in which said local hardening includes the additional step of locally masking said outer annular regions preparatory to exposing said central regions to a surface-hardening environment.

8. The method of claim 7, in which said masking includes thermal masking and in which said hardening is by thermal radiation.

9. The method of claim 7, in which said hardening is by chemical action and in which said masking is against such chemical action.

10. The method of claim 9, in which said masking includes the step of removably applying a layer of kaolin.

11. The product of the method of claim 6.

* * * * *